(12) United States Patent
Jacobs

(10) Patent No.: US 6,580,368 B1
(45) Date of Patent: Jun. 17, 2003

(54) VEHICLE LOCATOR DEVICE

(76) Inventor: Adam Jacobs, 123 Middle Neck Rd., Great Neck, NY (US) 11021

( * ) Notice: Subject to any disclaimer, the term of this patent is extended or adjusted under 35 U.S.C. 154(b) by 0 days.

(21) Appl. No.: 10/172,530

(22) Filed: Jun. 13, 2002

Related U.S. Application Data

(63) Continuation-in-part of application No. 09/587,814, filed on Jun. 6, 2000, now abandoned.

(51) Int. Cl.[7] ................................................. H04Q 7/00
(52) U.S. Cl. ..................... 340/539; 116/28 R; 116/209; 340/425.5
(58) Field of Search ............................. 340/425.5, 539, 340/471, 472, 468, 426, 988; 116/209, 28 R, 173

(56) References Cited

U.S. PATENT DOCUMENTS

| | | | |
|---|---|---|---|
| 4,052,697 A | | 10/1977 | Daifotes |
| 4,413,451 A | * | 11/1983 | Featherstone et al. ......... 52/28 |
| 4,624,211 A | | 11/1986 | Jokel |
| 5,721,550 A | | 2/1998 | Lopez |
| 5,779,345 A | | 7/1998 | Adams |
| 5,786,758 A | | 7/1998 | Bullock |
| 5,933,081 A | | 8/1999 | Jones |
| 6,023,218 A | | 2/2000 | Tremblay |
| 6,239,701 B1 | | 5/2001 | Vasquez et al. |
| 6,246,314 B1 | | 6/2001 | Djaid |

* cited by examiner

Primary Examiner—Brent A. Swarthout
(74) Attorney, Agent, or Firm—Michael D. Fitzpatrick

(57) ABSTRACT

A Vehicle Locator Device for helping people to find their parked vehicle in a parking lot or garage during the nighttime. Some advantages that this invention has over other inventions are that you will no longer have to listen to the annoying and piercing sounds of a panic button to find your vehicle. Another advantage to this invention is that finding your vehicle will be as simple as pressing a remote controlled key chain and looking for a bright beam of light that will be shining above your vehicle.

24 Claims, 3 Drawing Sheets

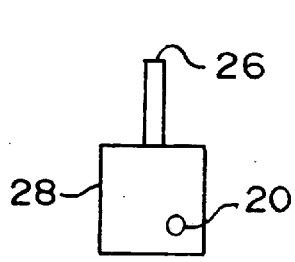 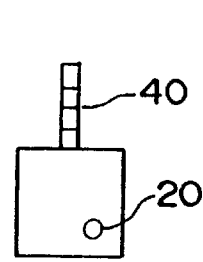 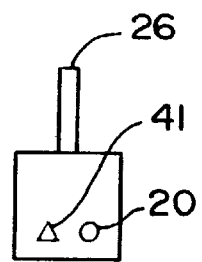 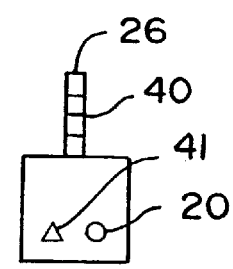
FIG. 5A    FIG. 5B    FIG. 5C    FIG. 5D
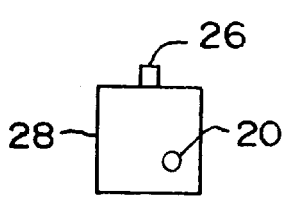 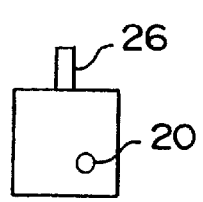 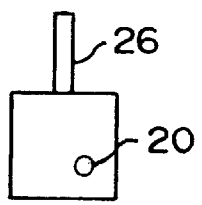 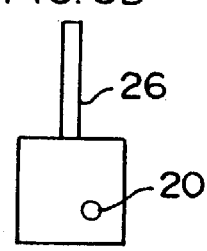
FIG. 6A    FIG. 6B    FIG. 6C    FIG. 6D
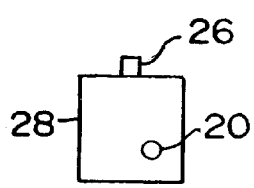 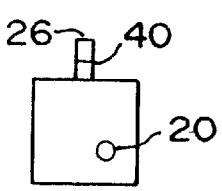 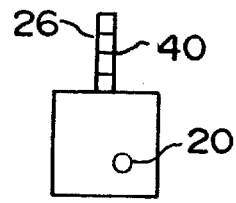 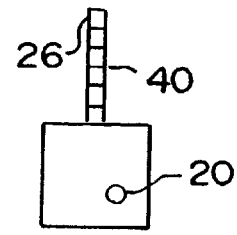
FIG. 7A    FIG. 7B    FIG. 7C    FIG. 7D
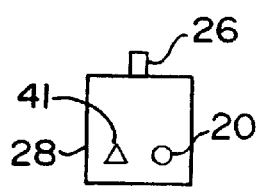 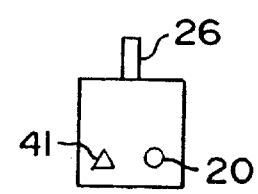 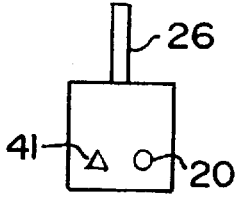 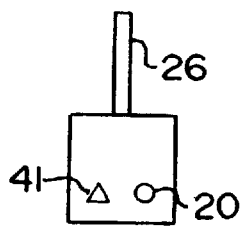
FIG. 8A    FIG. 8B    FIG. 8C    FIG. 8D
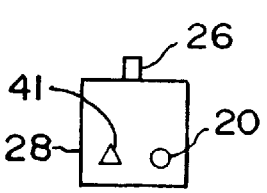 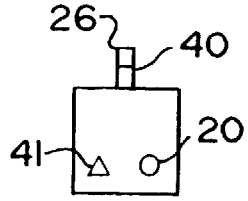 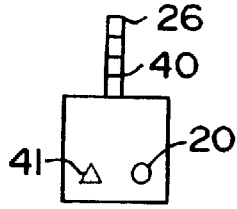 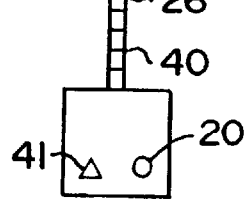
FIG. 9A    FIG. 9B    FIG. 9C    FIG. 9D

VEHICLE LOCATOR DEVICE

1.0 RELATED APPLICATIONS

This application is a continuation-in-part of a previous application filed in the United States Patent and Trademark Office by Adam Jacobs on Jun. 6, 2000, titled Vehicle Locator Device, and assigned Ser. No. 09/587,814, now abandoned. That previous application filed on Jun. 6, 2000, titled Vehicle Locator Device, and assigned Ser. No. 09/587,814 is hereby incorporated by reference into this continuation-in-part application.

STATEMENT REGARDING FEDERALLY SPONSORED RESEARCH

This invention was not made with Government support.

2.0 FIELD OF THE INVENTION

The present invention relates to devices for locating a parked vehicle.

3.0 BACKGROUND

This invention is an electronic invention which will assist people in locating where they have parked their vehicle, in the night time. It consists of three parts. A remote controlled key chain, a remote controlled light that will be placed inside or outside the vehicle and a remote controlled haze machine which will be placed on the outside top of the vehicle. When a button on the remote controlled key chain is pressed, the remote controlled key chain will send a signal to the remote controlled light and remote controlled haze machine. After receiving the signal, the remote controlled light and remote controlled haze machine will turn on. The remote controlled light when on, will send a beam of light above the vehicle. The remote controlled haze machine, when on, will send a puff of mist above the vehicle. An invention that uses similar technology to my invention is the remote key-less entry system. These systems enable people to open their vehicles without using their key, and also help people locate their vehicle by pressing a panic button. When the panic button is pressed, a person must listen to a loud alarm or honking sound. Instead of trying to find your vehicle by an annoying sound, which can also be difficult if your vehicle is parked far away, the Vehicle Locator Device's remote controlled light when activated will send a bright beam of light directly above the vehicle making the vehicle easy to see from a distance. A remote controlled haze machine will also be used and will be attached to the top of the vehicle with the proper attachments (the proper attachments are described later). This remote control haze machine, when receiving a signal from the remote controlled key chain, will release a cloud of mist above the vehicle at the same time the remote controlled light is turned on. This will make sure that the beam of light that is shining above the vehicle is shining into the mist thus illuminating the mist and making the beam of light visible.

Purpose of Invention

The purpose of the invention is to enable the user to locate his parked vehicle in a parking lot or garage which is especially useful at night time if the parking lot or garage is not illuminated.

4.0 BRIEF SUMMARY OF THE INVENTION

Description of the Invention, Drawings, and New Features

The general idea of the Vehicle Locator Device is to assist people who are looking for their vehicle, in a parking lot, during the nighttime. One advantage that this invention has over other inventions in this field are, that you will no longer have to listen to the annoying and piercing sound of a siren activated by a panic button to find your vehicle. Another advantage to this invention is that finding your vehicle will be as simple as pressing a remote controlled key chain and looking for a bright beam of light that will be shining above your vehicle.

5.0 BRIEF DESCRIPTION OF THE DRAWINGS

In the following descriptions of FIGS. 5(a) through (d), please note that the extension and retraction of the antenna shaped enclosure can either be commanded from the remote control key chain or performed manually.

In FIG. 5(a) shows the Vehicle Locator Device's remote controlled light and transparent antenna shaped enclosure;

(b) shows the Vehicle Locator Device's remote controlled light and antenna shaped enclosure with telescoping sections;

(c) shows the Vehicle Locator Device's remote controlled light, motor and antenna shaped enclosure;

and (d) shows the Vehicle Locator Device's remote controlled light, motor and antenna shaped enclosure with telescoping sections.

FIG. 6 shows the Vehicle Locator Device's remote controlled light and antenna shaped enclosure. The antenna shaped enclosure is shown increasing in size as it is manually extended.

FIG. 7 shows the Vehicle Locator Device's remote controlled light and antenna shaped enclosure with telescoping sections increasing in size as the antenna shaped enclosure is extended.

FIG. 8 shows the Vehicle Locator Device's remote controlled light and motor. The antenna shaped enclosure is shown increasing in size as the antenna shaped enclosure is extended.

FIG. 9 shows the Vehicle Locator Device's remote controlled light and motor. The antenna shaped enclosure with telescoping sections is shown increasing in size as the antenna shaped enclosure is extended.

6.0 DESCRIPTION

6.1 DETAILED DESCRIPTION OF THE ELEMENTS

Detailed Description of the Elements of the Preferred Embodiment

Figure 1:
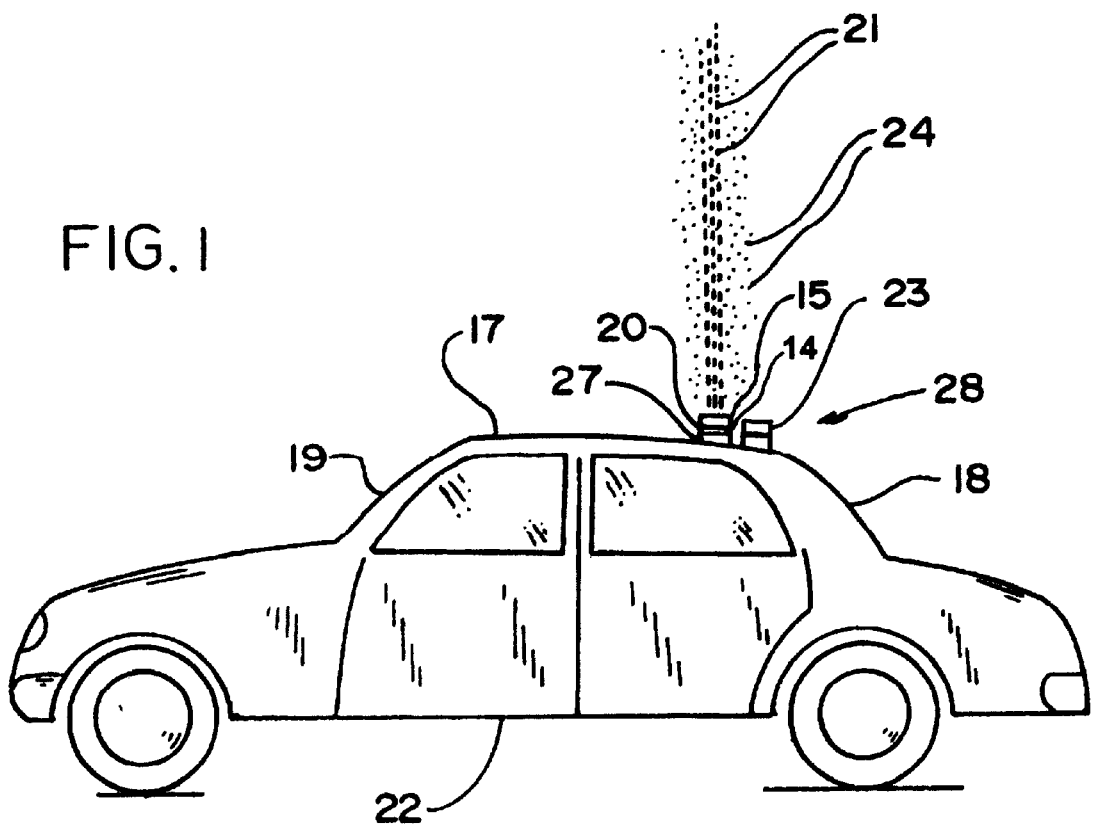
FIG. 1 shows the Vehicle Locator Device's remote controlled light attached to the top of a vehicle with the proper attachments, the remote controlled haze machine attached to the top of the vehicle with the proper attachments, and the remote controlled key chain used for activation.
Figure 1:
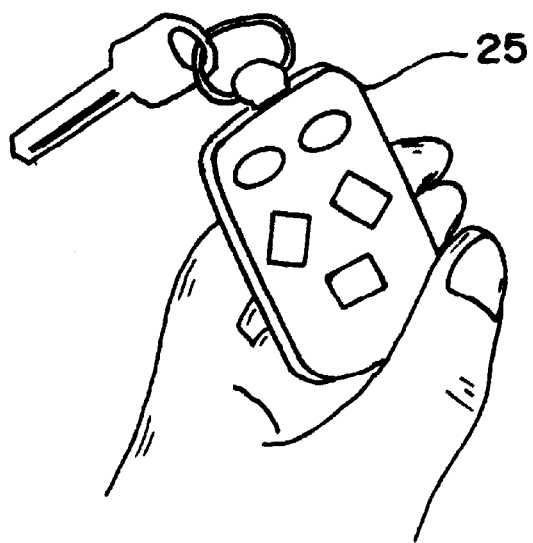
Figure 2:
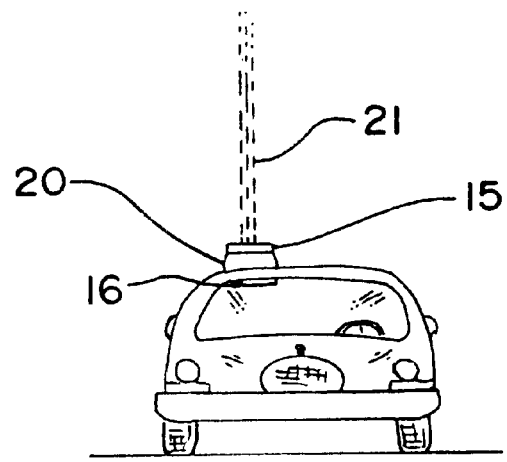
FIG. 2 is a front view illustration of the Vehicle Locator Device's remote controlled light attached to the inside of the front windshield of the vehicle by VELCRO. An optional color filter which can be placed on the remote controlled light is also shown.
Figure 3:
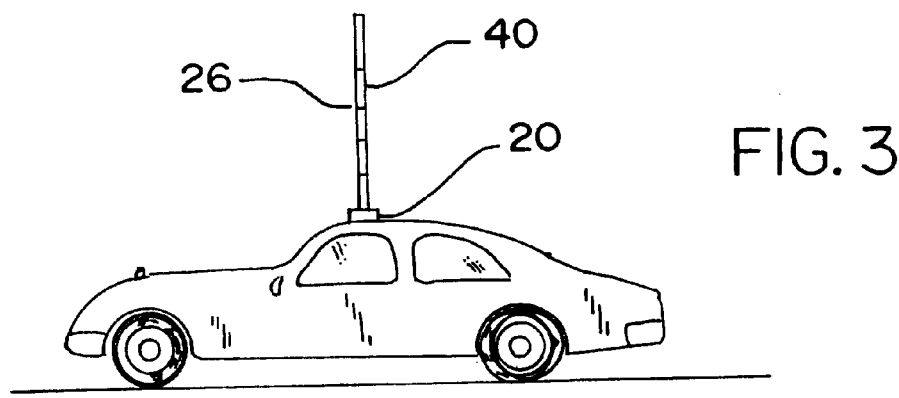
FIG. 3 is a side view illustration of the Vehicle Locator Device's transparent antenna shaped enclosure attached to the remote Controlled light, and shows the enclosure extended to its full length.
Figure 4:
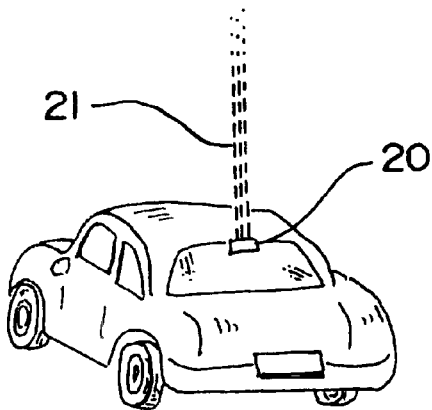
FIG. 4 is a rear view illustration of the Vehicle Locator Device's remote controlled light attached to the inside of the back windshield of the vehicle by VELCRO.

Turning now descriptively to the drawings, in which similar reference characters denote similar elements throughout the several views, FIG. 1 shows a vehicle locator device generally shown by reference number 28. The vehicle locator device consists of three parts: a remote controlled key chain 25, a remote controlled light 20, and a remote controlled haze machine 23. The remote controlled light 20 will be placed in the inside or on the outside of a vehicle 22. When the remote controlled light 20 is placed inside of the vehicle 22, it will be placed on the front windshield 19 or back windshield 18 with hook and loop fastener material such as VELCRO®. When the remote controlled light 20 is placed on the outside of the vehicle 22, it will be mounted on the roof 17. The attachment means 27 for mounting will either be via a bracket attachment such as is well known in the art, or using a magnetic attachment such as is well known in the art, or using hook and loop fastener material, such as, for example, VELCRO. (The remote controlled light 20 may also be built into the roof 17 or inside or into the vehicle 22 by methods which are well known in the art.) This includes any part of the vehicle 22.

When the remote controlled key chain 25 is pressed, it will send a signal to the remote controlled light 20 to turn it on, which will then send a beam of light 21 above a person's vehicle. This will make the process of finding your vehicle 22 very simple. The Vehicle Locator Device can be used in the following instances: 1) It is nighttime, and you have parked your vehicle 22 in a large parking lot. Instead of looking for your vehicle 22, simply press the remote controlled key chain 25 and you will immediately be able to locate your vehicle 22 because now you will see a beam of light 21 shining above your vehicle. 2) For security purposes: If you see someone standing too close to your vehicle 22 you can simply press your remote controlled key chain 25 and the beam of light 21 shining above your vehicle 22 will show them that you are aware of them.

A remote controlled haze machine 23 will also be used and will be mounted on the roof 17 of the vehicle 22. The attachment means 27 for mounting will either be via a bracket attachment such as is well known in the art, or using a magnetic attachment such as is well known in the art, or using hook and loop fastener material, such as, for example, VELCRO.

This haze machine 23, when receiving a signal from the remote controlled key chain 25, will release a cloud of mist 24 above the vehicle 22. This cloud of mist 24 will be released at the same time the remote controlled light 20 is turned on. This is very important because the remote controlled light 20 will be placed in a position so that it will shine a beam of light 21 through the mist 24 thus illuminating the mist 24 and making the beam of light 21 visible.

The type of remote controlled light 20, that is needed to send a visible beam of light 21 upward, during the nighttime is called a searchlight. The amount of power that is used by a searchlight to generate the brightness of the light is called candle power. Some similar lights that I have seen which are powerful enough to make a beam of light 21 visible are: the nightblaster handheld lights (made by a company by the name of Optronics) and Maxa Beam High intensity Xenon searchlights by Peak Beam. These types of searchlights range from 35,000 candlepower to over 6 million candle power. These searchlights have the ability to switch into a strobe light which will flash very brightly at a fast rate. The model numbers of these searchlights are: QH-130 and IR-1201 for the nightblaster models, and Mbs-410 for the Maxa Beam model.

These searchlights can be powered by rechargeable batteries or cigarette lighter adapters. The type of remote controlled light 20 that I will use, will depend on how high a powered light is legally allowed to shine from a vehicle. The remote controlled light 20 that I will use will follow these laws.

A reflector 16 which is part of the remote controlled light 20 will allow the beam of light 21 that is coming from the remote controlled light 20 to reflect at an angle or direction selected by the user.

A swivel 14 which is a part of the remote controlled light 20, will be used when the remote controlled light 20 is placed on top of the vehicle 22. It will allow the beam of light 21 that is coming from the remote controlled light 20 to shine at an angle or direction selected by the user. This will allow the the beam of light 21 to shine straight up in the air, at an angle, horizontally, or downward to shine on the top of the vehicle 22, or to shine in all directions simultaneously.

A snap-on color filter 15 may also be attached to the remote controlled light 20 so that a variety of colors can be seen.

An optional transparent antenna-shaped enclosure 26 can also be attached to the remote controlled light 20 so that the beam of light 21 that is coming from the remote controlled light 20 shines forth from the antenna-shaped enclosure 26. This antenna shaped enclosure 26 comprises a set of telescoping sections 40 and a motor 41 for extending and retracting the set of telescoping sections 40. When the remote control light 20 is turned on, the motor 41 causes the transparent antenna shaped enclosure 26 to extend to its full length into an antenna like shape. When the remote controlled light is turned off, the motor causes the transparent antenna shaped enclosure 26 to retract and recede.

When using this antenna shaped enclosure 26, the remote controlled light 20 will have threads on the upper portion of its outside wall. Then the antenna shaped enclosure 26 would have threads inside the lower portion of its inside wall so that it can be screwed onto the remote controlled light 20.

There are various types of remote controlled haze and fog machines 23 that can be used to release a puff of mist which can be made visible by a beam of light. The Magnum Pro1000 professional smoke machine, manufactured by Martin, and the Jungle Smoker 700 watt, mist fogger, manufactured by Jungle Smoker, which has a wired remote controlled. The model numbers for these machines are MP-1000 (for the Magnum Pro 1000) and Jungle Smoker-700-Top (for the Jungle Smoker). Some other remote controlled haze and fog machines 23 that can be used are the Antari HZ-100 Hazer, manufactured by Antari and the Lytequest Atomizer Haze machine, manufactured by Lytequest. The model numbers for these machines are: Haze-M (for the Antari Hz-100) and Hz-4001 (for the Lytequest Atomizer Haze machine).

The type of technology that will be used for the remote controlled key chain 25 to send a signal to the Vehicle Locator Device's remote controlled light 20 and remote controlled haze machine 23 thus causing them to turn on is similar to the technologies of sending a signal that is used in two way pagers, personal digital assistant email, and remote key-less entry systems.

"Brad Dye's paging information resource" (www.refreq.com), which is hereby incorporated by reference and is shown in appendix A to this application, under the heading "Two Way Paging" describes the type of two way paging technology that is utilized in my invention. (This document was found at www.refreq.com which was published by Refreq.com, c/o iland Internet Solutions Corp 401 Studewood Suite 340, Houston Tex. 77007.)

U.S. Pat. No. 6,047,047 issued to Aldridge et al (which is incorporated by reference) describes a telecommunications device for transmitting or receiving Email via infrared means, two way pager technology, and across telephone lines without requiring the use of a conventional computer or a service provider for access to an Email account.

U.S. Pat. No. 4,763,121 issued to Takahisa Tomoda et al (which is hereby incorporated by reference) describes sending a signal by remote key-less technology.

Some similar two way pagers and Personal digital Assistants that I have seen are the Palm VII Personal Digital Assistants (manufactured by the company Palm) and the Timeport P930 two way pager (which is manufactured by Motorola). A similar remote key-less entry system that I have seen is the remote key-less entry system that is used in 1999 Toyota trucks. This remote key-less entry system is made by the company TRW Inc. The Palm VII Personal Digital Assistants send wireless Email, and the Motorola two way pagers send wireless pages, and the remote key-less entry systems send wireless signals from a remote controlled key chain to a remote controlled receiver. These wireless devices have the ability to send and receive signals over a long distance. It is very important that the signal that is sent from the remote controlled key chain 25 to the remote controlled light 20 and remote controlled haze machine 23, is received. Therefore the remote controlled key chain 25 will have the necessary wireless capabilities to send a signal and the remote controlled light 20 and remote controlled haze machine 23 will have the necessary wireless capabilities to receive a signal.

In an alternative embodiment of my invention, when the user pushes the button on his remote controlled key chain, an email is sent from the key chain to the remote controlled receiver, which then activates the light and the haze machine. Such a technology is described in U.S. Pat. No. 6,047,047 issued to Aldridge et al (which is incorporated by reference). This patent describes a telecommunications device for transmitting or receiving Email via infrared means, two way pager technology, and across telephone lines without requiring the use of a conventional computer or a service provider for access to an Email account.

U.S. Pat. No. 4,763,121 issued to Takahisa Tomoda et al (which is hereby incorporated by reference) describes sending a signal by remote key-less technology. My invention utilizes a controller similar to the controller used by the invention of U.S. Pat. No. 4,763,121. In applicant's invention, the receiving device in the vehicle will incorporate such a controller. This controller repeatedly transmits a radio demand signal at regular intervals. In response to the user pressing the button on his remote controlled key chain, the radio code signal transmitter in the key chain transmits a radio code signal indicative of a pre-set code in response to the radio demand signal from the controller. The radio code signal transmitter which is in the remote controlled key chain is of pocket portable size for convenient transport by an authorized user. The controller receives and compares the pre-set code in the radio code signal from the radio code signal transmitter in the key chain and if they compare, the remote controlled light and haze machines are activated.

Additional information for Detailed Description (Some of this additional information may repeat information in the Detailed Description, but is included to ensure that all necessary information is included):

The Vehicle Locator Device for locating a vehicle 22 comprises a remote control key chain 25 having a remote control signal sender for sending a signal, a remotely controlled light 20, and attachment 27 for attaching the remotely controlled light 20 to the vehicle 22 to be located. Preferably the remotely controlled light 20 comprises a light for shining a beam of light 21 such that the beam of light 21 is visible above the vehicle 22, and further comprises a remote control signal receiver for receiving the signal, and communicating the signal to the light in order to turn on the light, and further has a transparent protective housing for housing the light. The light illuminates the housing making the housing visible. Most preferably the housing will have slots into which various user selectable color filters can be inserted. Preferably, the remotely controlled light 20 is a search light or a strobe light and has a candlepower between 35000 and six million candlepower. Preferably, this electronic invention utilizes either one-way pager or one way-email technology for the remote control signal sender and remote control signal receiver.

Preferably the remote controlled light 20 further comprises a reflector 16 for directing the beam of light 21 in an upward direction at a predetermined angle from vertical. Preferably the remote controlled light 20 further comprises an adjustable means for adjusting the direction in which the beam of light 21 shines as a desired angle from vertical, whereby the light can be adjusted such that a beam of light 21 shines in the direction selected by the user.

More preferably the Vehicle Locator Device further comprises a remotely controlled mister for spraying a mist directly above the vehicle just after turning on the light for making the beam of light 21 more visible; and a remote control receiver for receiving said signal, and communicating said signal to said mister in order to activate said mister. Most preferably the mister is either a haze machine 23 or a fog machine, and the mister along with the remotely controlled light 20 is placed on top of the vehicle 22 to be located. Most preferably the mister is placed on the roof of the vehicle 22 to be located.

This remote controlled light 20 is attached to a window of the vehicle to be located using suitable attachment means 27 such as hook and loop fastener material. An example of such hook and loop fastener material is VELCRO. Other types of attachment means 27 which can be used are brackets and magnetic means.

A vehicle 22 with the instant invention installed would be located as follows:
  (a) the remote controlled light 20 is first attached to a window of the vehicle 22 to be located.
  (b) the included adjustment means is adjusted so that the beam of light 21 shines straight upward when the light is activated.
  (c) the mister is attached to the top of the vehicle 22 to be located.
  (d) while one is still a distance from the vehicle 22 to be located, one would activate the remote control button of his remote control key chain 25 which causes a signal to be sent to the remote control signal receiver associated with the remotely controlled light 20 thus causing the light to turn on. Simultaneously with the light turning on, a signal is sent to the remote control signal receiver associated with the remotely controlled mister which causes the mister to release mist 24 directly above the vehicle 22 to be located.

Thus the mist released by the mister is illuminated by the light thus making it easy to locate the vehicle 22 which is to be located.

Preferably, the technology used for the remote control signal Sender and remotely controlled light 20 is either two-way pager or two-way email technology, the remote controlled light 20 further comprises a signal sender for sending a signal back to the remote control key chain 25, and the mister further comprises a signal sender for sending a signal back to the remote control key chain 25. The remote control key chain 25 further comprises a signal receiver for receiving the the signals from the remote controlled light's signal sender and the mister's signal sender. There will be an indicator light on the remote controlled key chain 25 which will illuminate when the signal receiver in the key chain 25 receives the signals from the remote controlled lights signal sender and the mister's signal sender.

In a most preferred embodiment of applicant's invention, the remotely controlled light 20 will be mounted on a swivel 14 which in turn is attached to the vehicle 22 to be located by such attachment means 27 as a bracket attachment, hook and loop fastener material, or magnetic means. The remotely controlled light 20 may also be built inside or into the vehicle 22 by methods which are well known in the art.

In another preferred embodiment, the housing which encloses the remotely controlled light 20 is a transparent antenna shaped enclosure 26. This transparent antenna shaped enclosure 26 comprises a set of telescoping sections 40 and a motor 41 for extending and retracting said set of telescoping sections 40. When the remote controlled light 20 is activated, the motor 41 causes the transparent antenna shaped enclosure 26 to extend to its full length thus assuming an antenna-like shape. When the remote controlled light 20 is no longer activated, the motor 41 causes the transparent antenna shaped enclosure 26 to retract and recede.

It will be understood that each of the elements described above, or two or more together may also find a useful application in other types of devices and methods differing from those types described above.

Alternatives and the Closing

Thus the reader will see that my vehicle locator device supplies a long felt need for a simple, economical, easy to use means for locating a parked vehicle.

Although the present invention has been described in considerable detail with reference to certain preferred versions thereof, other versions are possible which will be apparent to those who are skilled in the art. While certain novel features of this invention have been shown and described and are pointed out in the annexed claims, it is not intended to be limited to the details above, since it will be understood that various omissions, modifications, substitutions and changes in the forms and details of the embodiments illustrated and in their operation can be made by those skilled in the art without departing in any way from the spirit of the present invention. Therefore, the spirit and scope of the appended claims should not be limited to the description of the preferred embodiments contained herein, but by the appended claims and their legal equivalents.

LIST OF REFERENCE NUMBERS 14 swivel
15 snap on color filter
16 reflector
17 roof
18 back windshield
19 front windshield
20 Remote controlled light
21 beam of light
22 vehicle
23 remote controlled haze machine
24 mist
25 remote controlled key chain
26 antenna shaped enclosure
27 attachment means
28 Vehicle Locator Device
40 telescoping sections
41 motor

What is claimed is:

1. A vehicle locator device for locating a vehicle comprising:
    (a) a remote control key chain having a remote control signal sender for sending a signal;
    (b) a remote controlled light, said remote controlled light comprising:
        (i) a light for shining a beam of light such that said light is visible above the vehicle;
        (ii) a remote control signal receiver for receiving said signal, and communicating said signal to said light in order to turn on said light;
        (iii) a protective housing for housing said light, said light illuminating said housing;
        (iv) a reflector for directing the beam of light in an upward direction at a predetermined angle from vertical;
        (v) adjustable means for adjusting the direction in which the light beam shines as a desired angle from vertical, whereby the light can be adjusted such that a beam of light shines in the direction selected by the user; and
    (c) attachment means for attaching the remote controlled light to the vehicle to be located.

2. The vehicle locator device of claim 1 wherein said remote controlled light is for attachment to a window of the vehicle to be located.

3. The vehicle locator device of claim 2 wherein the vehicle locator device further comprises:
    (a) a remotely controlled mister selected from the group consisting of haze machines and fog machines for spraying a mist directly above the vehicle just after turning on the light for making the beam of light to be shined more visible; and
    (b) a remote control receiver for receiving said signal, and communicating said signal to said mister in order to activate said mister.

4. The vehicle locator device of claim 1 wherein the vehicle locator device further comprises:
    (a) a remotely controlled mister for spraying a mist directly above the vehicle just after turning on the light for making the beam of light to be shined more visible; and
    (b) a remote control receiver for receiving said signal, and communicating said signal to said mister in order to activate said mister.

5. The vehicle locator device of claim 4 wherein the remotely controlled mister is selected from the group consisting of haze machines and fog machines.

6. The vehicle locator device of claim 4 wherein the mister is for placing on top of the vehicle to be located.

7. The vehicle locator device of claim 4 wherein the mister is for placing on the roof of the vehicle to be located.

8. The vehicle locator device of claim 4 wherein the technology used for the remote control signal sender and remote controlled light is either two-way pager or two way-email technology, and
    (a) the remote controlled light further comprises a signal sender for sending a signal back to the remote control key chain;
    (b) the mister further comprises a signal sender for sending a signal back to the remote control key chain; and
    (c) the remote control key chain further comprises:
        (i) a signal receiver for receiving said signals from the remote controlled light's signal sender and the mister's signal sender; and (ii) an indicator light for illuminating when the signal receiver receives said signals from the remote controlled light's signal sender and the mister's signal sender.

9. The vehicle locator device of claim 1 wherein the protective housing is transparent.

10. The vehicle locator device of claim 1 wherein the remote controlled light is selected from the group consisting of search lights and strobe lights.

11. The vehicle locator device of claim 1 wherein the technology used for the remote control signal sender and remote control signal receiver is either one-way pager or one way-email technology.

12. The vehicle locator device of claim 1 further comprising a swivel upon which the remote controlled light is mounted, said swivel in turn being attached to the vehicle to be located by said attachment means.

13. The vehicle locator device of claim 1 further comprising a user selectable color filter.

14. The vehicle locator device of claim 1 wherein said housing is an antenna-shaped enclosure.

15. The vehicle locator device of claim 14 wherein said antenna-shaped enclosure comprises a set of telescoping sections and a motor for extending and retracting said set of telescoping sections, whereby when said remote controlled light is activated, said motor causes said antenna-shaped enclosure to extend to its full length thus assuming an antenna-like shape, and when no longer activated, said motor causes said antenna-shaped enclosure to retract and recede.

16. A vehicle locator device for locating a vehicle comprising:
   (a) a remote control key chain having a remote control signal sender for sending a signal;
   (b) a remote controlled light;
   (c) attachment means for attaching the remote controlled light to the vehicle to be located;
   (d) a remotely controlled mister for spraying a mist directly above the vehicle just after turning on the light for making the beam of light to be shined more visible; and
   (e) a remote control receiver for receiving said signal, and communicating said signal to said mister in order to activate said mister.

17. The vehicle locator device of claim 16 wherein the mister is selected from the group consisting of haze machines and fog machines.

18. A vehicle locator device for locating a vehicle having a roof, said vehicle locator device comprising:
   (a) a remote control key chain having a remote control signal sender for sending a signal;
   (b) a remote controlled light, said remote controlled light comprising:
      (i) a light for shining a beam of light such that said light is visible above the vehicle;
      (ii) a remote control signal receiver for receiving said signal, and communicating said signal to said light in order to turn on said light; and
      (iii) an antenna-shaped protective housing for housing said light, said antenna-shaped protective housing comprising a set of telescoping sections, each of said telescoping sections having an exterior surface, said light shining through each of the telescoping sections, whereby the exterior surface of each telescoping section appears illuminated.

19. The vehicle locator device of claim 18, further comprising a motor for extending and retracting said set of telescoping sections, whereby when said remote controlled light is activated, said motor causes said antenna-shaped protective housing to extend to its full length thus assuming an antenna-like shape, and when no longer activated, said motor causes said antenna-shaped protective housing to retract and recede.

20. The vehicle locator device of claim 18, further comprising attachment means for attaching the remote controlled light to the vehicle to be located.

21. The vehicle locator device of claim 18, wherein the remote controlled light is built into the roof of the vehicle to be located.

22. The vehicle locator device of claim 19, further comprising attachment means for attaching the remote controlled light to the vehicle to be located.

23. A vehicle locator device for locating a vehicle having a roof, said vehicle locator device comprising:
   (a) a remote control key chain having a remote control signal sender for sending a signal;
   (b) a remote controlled light, said remote controlled light comprising:
      (i) a light for shining a beam of light such that said light is visible above the vehicle;
      (ii) a remote control signal receiver for receiving said signal, and communicating said signal to said light in order to turn on said light;
      (iii) an antenna-shaped protective housing for housing said light, said antenna-shaped protective housing having an exterior surface, said light shining through said housing, such that exterior surface of said housing appears illuminated; and
   (c) a motor for extending and retracting said antenna-shaped protective housing, whereby when said remote controlled light is activated, said motor causes said antenna-shaped protective housing to extend to its full length thus assuming an antenna-like shape, and when no longer activated, said motor causes said antenna-shaped protective housing to retract and recede.

24. A method for the user of a vehicle having air thereabove to locate his vehicle by means of two signals transmitted to said vehicle by said user, said method comprising the steps of:
   (a) transmitting a first signal from said user to said vehicle;
   (b) in response to the first signal received from the user, illuminating the air above said vehicle;
   (c) transmitting a second signal from said user to said vehicle, and
   (d) in response to the second signal received from the user, misting the illuminated air above said vehicle;
whereby the user locates his vehicle by noticing the misted illuminated air above his vehicle.

* * * * *